(12) United States Patent
Wang

(10) Patent No.: US 8,078,859 B2
(45) Date of Patent: Dec. 13, 2011

(54) METHOD OF CONFIGURING COMPUTERS WITH EXPANSION CARDS

(75) Inventor: Zhen Wang, Shenzhen (CN)

(73) Assignees: Hong Fu Jin Precision Industry (ShenZhen) Co., Ltd., Shenzhen, Guangdong Province (CN); Hon Hai Precision Industry Co. Ltd., Tu-Cheng, New Taipei (TW)

( * ) Notice: Subject to any disclaimer, the term of this patent is extended or adjusted under 35 U.S.C. 154(b) by 420 days.

(21) Appl. No.: 12/421,718

(22) Filed: Apr. 10, 2009

(65) Prior Publication Data

US 2010/0082964 A1    Apr. 1, 2010

(30) Foreign Application Priority Data

Sep. 26, 2008    (CN) .............. 2008 1 0304685

(51) Int. Cl.
*G06F 9/24* (2006.01)
*G06F 15/177* (2006.01)
*G06F 13/00* (2006.01)

(52) U.S. Cl. ............. 713/1; 713/2; 710/104; 710/301
(58) Field of Classification Search ............ 713/1, 2; 710/104, 301
See application file for complete search history.

(56) References Cited

U.S. PATENT DOCUMENTS

| | | | |
|---|---|---|---|
| 7,162,554 B1 * | 1/2007 | Cole et al. | 710/104 |
| 2003/0191931 A1 * | 10/2003 | Yonemura | 713/1 |
| 2005/0010746 A1 * | 1/2005 | Chen et al. | 713/1 |
| 2006/0183501 A1 * | 8/2006 | Egoshi et al. | 455/558 |
| 2007/0094425 A1 * | 4/2007 | Chang | 710/69 |
| 2007/0192582 A1 * | 8/2007 | Agan et al. | 713/2 |
| 2008/0065798 A1 * | 3/2008 | Lu | 710/104 |

* cited by examiner

*Primary Examiner* — Vincent Tran
(74) *Attorney, Agent, or Firm* — Altis Law Group, Inc.

(57) ABSTRACT

A method of configuring a computer with an expansion card to process a basic input output system (BIOS) program thereof, includes performing an expansion card detecting program to detect and identify the expansion card by reading signals from an identifying finger of the expansion card, and loading a configuration program associated with the detected expansion card of the BIOS program.

9 Claims, 2 Drawing Sheets

METHOD OF CONFIGURING COMPUTERS WITH EXPANSION CARDS

BACKGROUND

1. Technical Field

The present disclosure relates to a method of configuring computers for recognizing riser cards or expansion cards assembled thereon.

2. Description of Related Art

A riser card is a board that plugs into a system board and provides additional slots for expansion cards. It is common to vary functions of computers by changing riser cards therein, especially in servers. For example, a riser card along with associated power supplies and fans attached to the riser card may be replaced by a different riser card and associated power supplies and fans. However, the original BIOS of the computer may not work properly with the different riser card, such that the basic input output system (BIOS) must be reinstalled with different configurations to support the different riser card.

What is needed, therefore, is a method of configuring computers with a BIOS that can work with more than one type of riser card.

DETAILED DESCRIPTION

Figure 1:
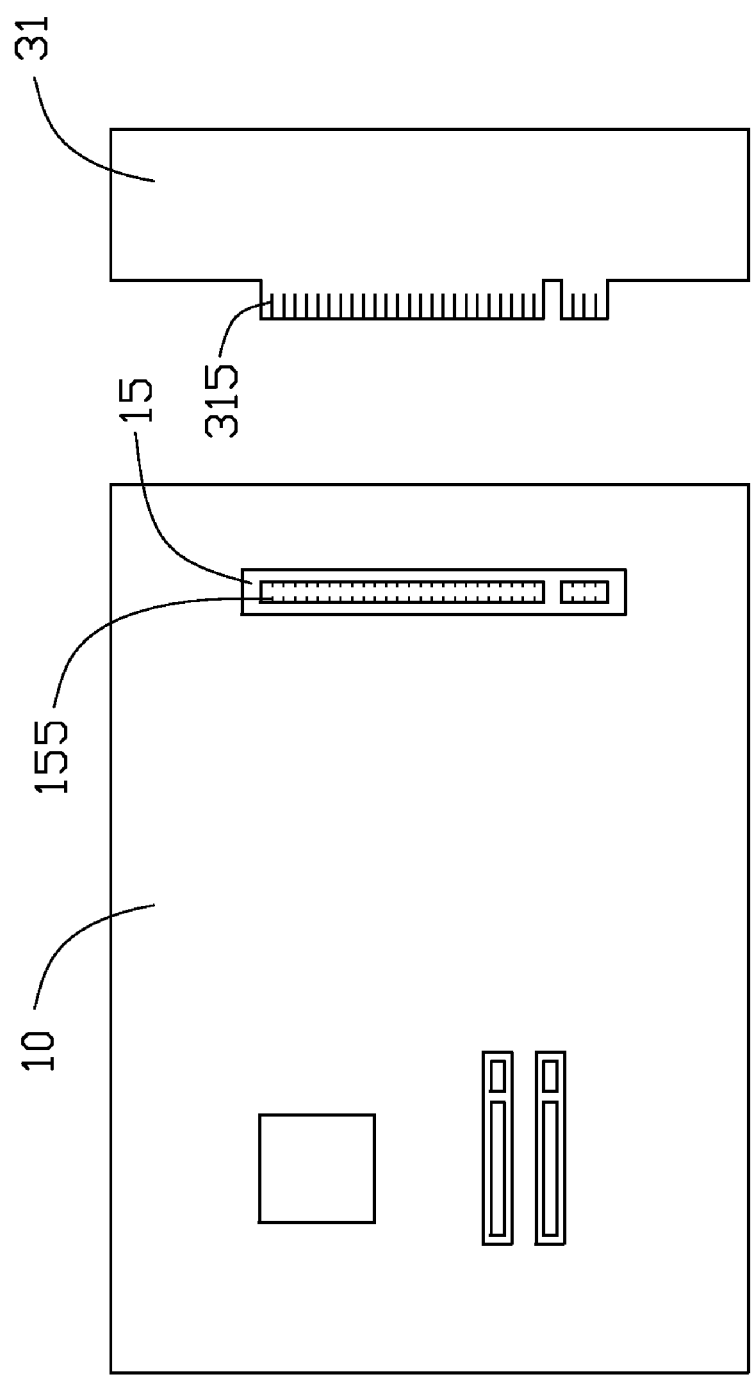
FIG. 1 is an exploded sketch view of an embodiment of a computer, the computer including a motherboard and a riser card.

Referring to FIG. 1, an embodiment of a computer includes a motherboard 10 and a riser card 31. The motherboard 10 includes a slot 15 to receive the riser card 31. The riser card 31 includes an identifying finger 315. A detecting pin 155 is installed in the slot 15 to detect a type of the riser card 31 by reading signals from the riser card through the identifying finger 315. The riser card 31 can be replaced by other types of riser cards.

A basic input output system (BIOS) program is installed in the motherboard 10 to enable the computer to start an operating system and to communicate with the various devices in the system, such as disk drives, keyboard, monitor, printer, and communications ports. The BIOS program includes a riser card detecting program for detecting an identification number of a riser card attached to the motherboard 10, a plurality of configuration programs to drive different types of riser cards, and a basic hardware initializing program. The riser card detecting program comprises contents which correspond to an identification of the riser card 31.

Figure 2:
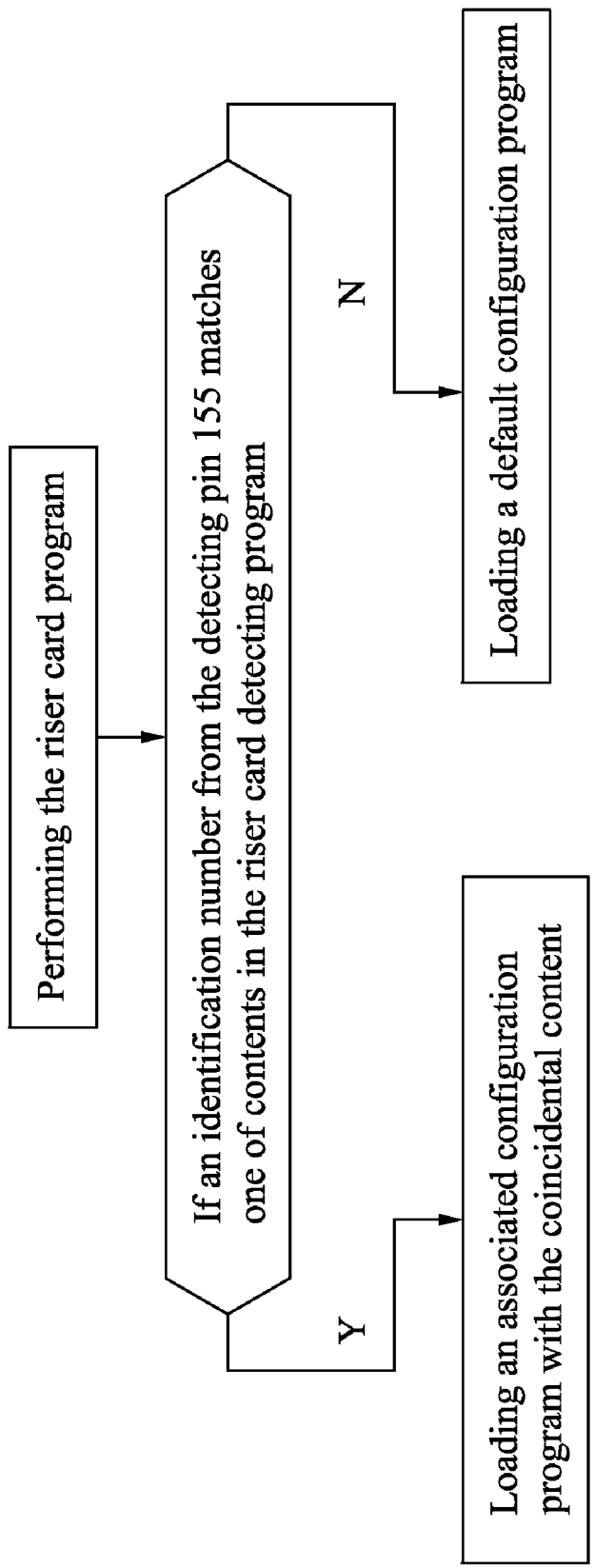
FIG. 2 is a block diagram of an embodiment of a method of configuring the computer with an assembled riser card.

Referring to FIG. 2, in one embodiment, when the computer is started, the BIOS program first performs a power-on self test (POST) to determine if every component is connected and functioning properly. After the POST is completed, the riser card detecting program is performed. If the identification number from the detecting pin 155 matches one of the contents in the riser card program, a first riser card has been detected, and the BIOS program loads a first configuration program to drive the first riser card. The riser card detecting program continues for each subsequent detected riser card. If a riser card is not recognized, the BIOS program will load a default configuration program for the computer. Finally, the computer executes a basic hardware initializing program of the BIOS program.

The configuration programs of the BIOS program can ensure desired performance standards of the computer even when different types of riser cards are used. In other embodiments, the riser card can be an expansion card.

It is to be understood, however, that even though numerous characteristics and advantages have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

The invention claimed is:

1. A method of configuring a computer with an expansion card to process a basic input output system (BIOS) program thereof, the method comprising:
   performing an expansion card detecting program to detect and identify the expansion card by reading signals from an identifying finger of the expansion card through a detecting pin of a slot of a motherboard of the computer;
   loading an associated configuration program with the detected expansion card of the BIOS program; and
   executing a basic hardware initializing program of the BIOS program;
   wherein the expansion card detecting program comprises contents, the contents correspond to an identification of the expansion card; performing an expansion card detecting program further comprises: determining if an identification number from the detecting pin matches one of the contents in the expansion card detecting program, and if matching, then loading the configuration program associated with the content,
   if the identification number from the detecting pin does not match one of the contents in the expansion card detecting program, then loading a default configuration program.

2. The method of claim 1, wherein the expansion card detecting program is performed after a power-on self test (POST).

3. The method of claim 1, wherein the expansion card is a riser card to add additional expansion cards to the computer.

4. A method of configuring a computer with an expansion card, the method comprising:
   providing a connection between a detecting pin in a slot of a motherboard of the computer to an identifying finger of the expansion card by installing the expansion card into the slot;
   detecting an identification of the expansion card through the detecting pin while performing a BIOS program of the computer;
   loading an associated configuration program with the expansion card of the BIOS program; and
   executing a basic hardware initializing program of the BIOS program;
   wherein the expansion card detecting program comprises contents, the contents correspond to an identification of the expansion card; detecting an identification of the expansion card further comprises: determining if an identification number from the detecting pin matches one of the contents in the expansion card detecting program, and if matching, then loading the configuration program associated with the content;

if the identification number from the detecting pin does not match one of the contents of the expansion card detecting program, then loading a default configuration program.

5. The method of claim 4, wherein detecting the identification of the expansion card comprises reading signals from the identifying finger of the expansion card through the detecting pin.

6. The method of claim 4, wherein detecting an identification of the expansion card is performed after a power-on self test (POST).

7. The method of claim 4, wherein the expansion card is a riser card to add additional expansion cards to the computer.

8. A method of configuring an expansion card in a motherboard of a computer while performing a BIOS program through an expansion card detecting program executed by a processor, the expansion card detecting program comprising contents which associating with a plurality of configuration programs, the method comprising:
- detecting the expansion card by reading signals from an identifying finger of the expansion card through a detecting pin of a slot of the motherboard;
- determining if an identification number from the detecting pin matches a first content of the contents;
- loading a matched configuration program associated with the first content when the identification number from the detecting pin matches the first content; and
- loading a default configuration program when the identification number from the detecting pin does not match the first content.

9. The method of claim 8, wherein the expansion card detecting program is performed after a power-on self test (POST).

* * * * *